(12) United States Patent
Sarkar et al.

(10) Patent No.: US 8,842,812 B2
(45) Date of Patent: Sep. 23, 2014

(54) METHOD AND APPARATUS FOR PROVIDING IMPROVED SUPPORT TO USERS ON INTERACTIVE VOICE RESPONSE BREAKOUT SESSION

(75) Inventors: Shantanu Sarkar, San Jose, CA (US); Michael P. Lepore, Marlborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 1462 days.

(21) Appl. No.: 12/396,558

(22) Filed: Mar. 3, 2009

(65) Prior Publication Data

US 2010/0226489 A1  Sep. 9, 2010

(51) Int. Cl.
  *H04M 11/00* (2006.01)
  *H04M 3/00* (2006.01)
  *H04M 3/51* (2006.01)

(52) U.S. Cl.
  CPC .... *H04M 3/5166* (2013.01); *H04M 2203/2038* (2013.01)
  USPC ................................. 379/88.18; 379/265.01

(58) Field of Classification Search
  USPC .............................. 379/265.01, 265.09, 88.18
  See application file for complete search history.

(56) References Cited

U.S. PATENT DOCUMENTS

| | | | |
|---|---|---|---|
| 5,483,582 A * | 1/1996 | Pugh et al. | 379/144.01 |
| 2006/0250989 A1* | 11/2006 | Wengrovitz | 370/260 |
| 2007/0211881 A1* | 9/2007 | Parker-Stephen | 379/265.01 |
| 2009/0003549 A1* | 1/2009 | Baird et al. | 379/88.18 |
| 2010/0128854 A1* | 5/2010 | LaCroix et al. | 379/88.04 |
| 2010/0158236 A1* | 6/2010 | Chang et al. | 379/265.03 |
| 2010/0257032 A1* | 10/2010 | Tran | 705/14.1 |

* cited by examiner

*Primary Examiner* — Rasha Al Aubaidi
(74) *Attorney, Agent, or Firm* — P. Su

(57) ABSTRACT

In one embodiment, a method includes obtaining context information associated with a call into a call center. The context information includes at least one input provided by a caller during the call. The method also includes determining when the caller requests an interaction with an agent associated with the call center, and providing the context information to the agent when the caller requests the interaction with the agent. A communications session is maintained between the caller and the agent when the caller requests the interaction with the agent.

6 Claims, 7 Drawing Sheets

METHOD AND APPARATUS FOR PROVIDING IMPROVED SUPPORT TO USERS ON INTERACTIVE VOICE RESPONSE BREAKOUT SESSION

BACKGROUND OF THE INVENTION

The present invention relates generally to enterprise networking.

Many organizations use call centers to provide service to callers, e.g., customers or clients. When a caller calls into, or otherwise accesses, a call center via a device such as a telephone, the caller generally accesses an automatic call distributor (ACD). The ACD typically includes an interactive voice response (IVR) system which may be dual-tone multi frequency (DTMF) digit and/or speech driven. The caller may interact with the IVR system to achieve a purpose. By way of example, a user may call into a call center of a bank, and interact with an IVR system associated with the call center by providing an account number, providing identifying information such as a portion of a social security number, and making menu selections appropriate to allow him or her to obtain an account balance.

During a call into a call center, a caller may request assistance from a service agent or operator. The service agent or, more generally, agent, may interact with the caller in an IVR breakout session when the caller effectively breaks out of an IVR tree. In some instances, the caller may request assistance from the agent after unsuccessfully navigating through menus associated with the IVR system. For example, the caller may request assistance from the agent when he or she becomes frustrated after extensive, but unsuccessful, interaction with the IVR system. Often, the agent is able to assist the caller in achieving the purpose of his or her call.

In the course of assisting the caller, however, the agent may have the caller provide information which the caller has already provided to the IVR system. Additionally, the caller may effectively be forced to explain the problems he or she has experienced with the IVR system in order for the agent to assist the caller in achieving the purpose of his or her call.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

Figure 1:
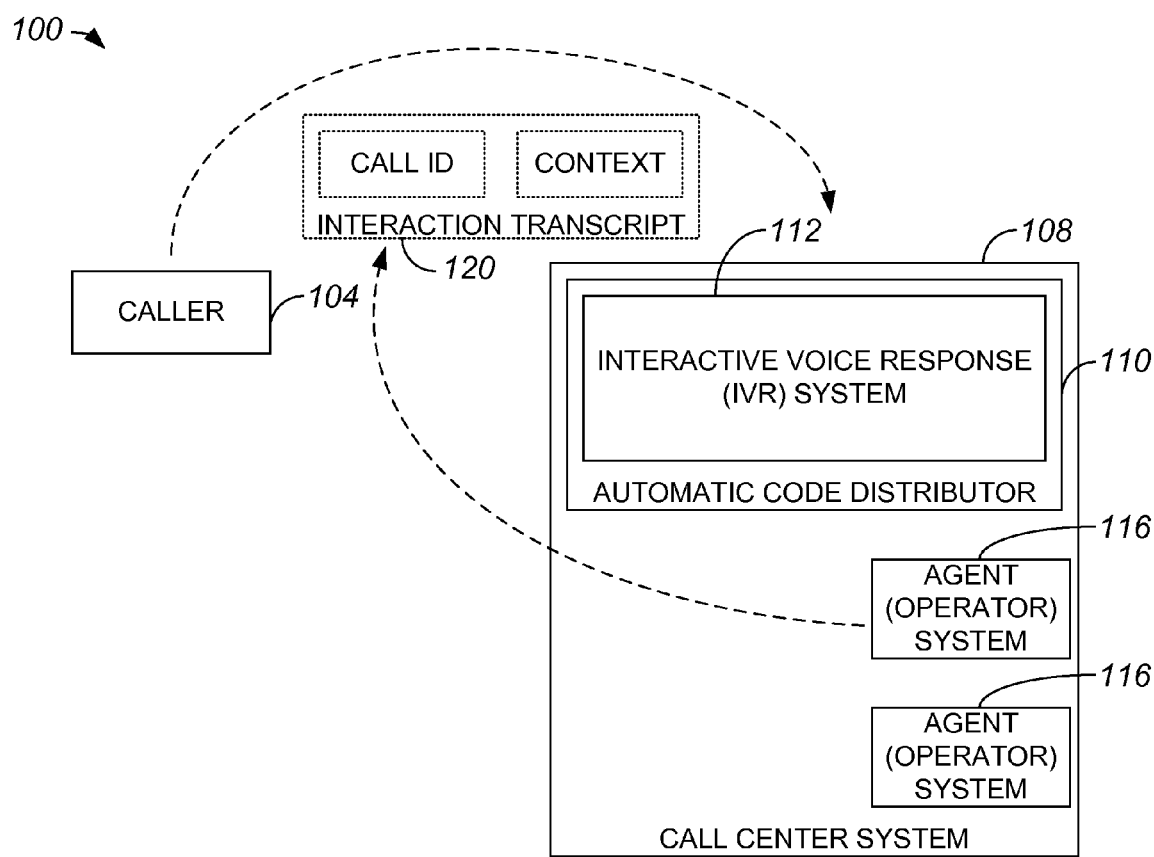
FIG. 1 is a block diagram of an overall system in which enables an operator or agent system of a call center system to access an interaction transcript generated through the interaction of a caller with an interactive voice response (IVR) system, via an agent interface, in accordance with an embodiment of the present invention.

According to one aspect of the present invention, a method includes obtaining context information associated with a call into a call center. The context information includes at least one input provided by a caller during the call. The method also includes determining when the caller requests an interaction with an agent associated with the call center, and providing the context information to the agent when the caller requests the interaction with the agent. A communications session is maintained between the caller and the agent when the caller requests the interaction with the agent. In one embodiment, the context information may be implicit, e.g., a phone number, or may be information provided by the caller prior to the call.

Description

When a caller or customer of a call center breaks out of an interactive voice response (IVR) tree of a call center to access an operator or agent, the agent is generally has no context information relating to the caller. By way of example, the agent may be unaware of the types of interaction the caller has had with an IVR system and the length of time the caller has been interacting with the IVR system. Without context information, the agent may be unable to provide appropriate support to the caller unless the agent asks the caller questions. Many of the questions asked by the agent may already have been asked by the IVR system when the user interacted with the IVR system. As the caller may already have provided the information requested by the agent while interacting with an IVR tree or menu system, having to provide the information again may cause the customer great dissatisfaction.

By capturing context information while a caller interacts with an IVR system during a call, and then providing the captured context information to an agent when the caller requests assistance from an agent, the agent may efficiently provide the caller with support that is specific to issues encountered by the caller. The context information, which may be captured as an interaction transcript, may include IVR path information, or information which identifies the IVR menus accessed by the caller and the inputs provided by the caller during the call. The context information may also include a current length of the call, and/or call-related information such as a calling number. It should be appreciated that in a voice-driven or speech-based system, context information may also include recordings of a caller's answers to callers and/or statistics relating to choices made. When the agent is presented, e.g., visually presented, with the context information, the agent may readily identify the previous actions of the caller, and may be able to efficiently assist the caller in achieving the purpose of the call. Hence, the caller may receive satisfactory assistance from the agent substantially without repeating information he or she has already provided while interacting with IVR menus.

In one embodiment, when a caller interacts with an agent during an IVR breakout session, the agent may effectively determine why the caller has been unsuccessful during his or her interactions with the IVR menus. Upon determining when the caller has been unsuccessful in achieving the purpose of the call, the agent may "re-insert" the caller into the IVR system at an appropriate point in an IVR tree. For example, if the caller has been unsuccessful in achieving the purpose of the call because he or she has provided the wrong information at a particular point in the IVR tree, the agent may cooperate with the IVR system to re-insert the caller at the point in the IVR tree where the wrong information was provided. Once re-inserted at the appropriate point in the IVR tree, the caller may resume interactions with the IVR system by effectively correcting the wrong information that was provided. It should be appreciated that the caller will generally be substantially spared from re-entering information which was entered with respect to earlier points in the IVR tree. The agent may also choose to essentially insert the caller into a different point in the IVR tree, for example by inserting the user into the point where he or she would have been had he or she entered the correct input. In some instances, the agent may also choose to correct input from the caller, and then essentially re-insert them at a point in the tree corresponding to the point with which the corrected input is associated.

An IVR tree, or overall menu system, generally includes branches or levels which a caller may access based upon inputs the caller provides with respect to the IVR tree. An IVR tree may include a primary node, branch, or menu from which secondary nodes, branches, or menus may be reached. By way of example, an IVR tree associated with a banking call center system may include a primary menu which allows a caller to provide a type of account he or she possesses. Depending upon the type of account the caller possesses, the primary menu effectively routes the caller to an appropriate secondary menu, or a menu that corresponds to the account type. A path that a caller effectively navigates through an IVR tree is generally context information included in an interaction transcript for a call.

The context stored in an interaction transcript may generally include dual-tone multi frequency (DTMF) digits entered by a caller and/or keywords spoken by a caller during a call or, more generally, a user session. The context may also include output of a natural language recognition system that is arranged to process speech from the caller. When a caller calls into a call center, an interaction transcript is maintained for the call. The interaction transcript is typically stored and maintained by a call center for statistical purposes, after the call is completed or otherwise terminated.

Referring initially to FIG. 1, a call center system which provides an operator or agent system with access an interaction transcript generated through the interaction of a caller with an IVR system will be described in accordance with an embodiment of the present invention. A overall system 100, which may be an enterprise network system, includes a call center system 108 that is accessible to a caller or user 104. Call center system 108 includes an automatic call distributor (ACD) that has an IVR system 112, and supports any number of operator or agent systems 116. An agent system or interface 116 may be a computing system which may be associated with a human operator or agent (not shown).

When caller 104 calls into call center system 112, caller 104 accesses IVR system 112. IVR system 112 may generally includes a tree or menu structure that caller 104 may navigate through using a calling device, e.g., a telephone or a computer system which is arranged to support a telephone. Typically, caller 104 may navigate through a tree structure by speaking and/or inputting digits using a keypad.

An interaction transcript 120 is created and maintained, e.g., updated, by IVR system 112. As caller 104 navigates through an IVR tree (not shown), interaction transcript 120 is updated to include information which identifies the interactions of caller 104 with IVR system 112. Information stored in interaction transcript 120 may include, but is not limited to including, information which identifies a call or user session and context information. For example, IVR path information may be stored as context information in interaction transcript 120 by identifying and storing DTMF digits provided by caller 104 and/or keywords spoken by caller 104. The DTMF digits and/or spoken keywords may be translated or otherwise transformed into a different format before being stored as context information. The different format may be substantially any format needed to allow for efficient processing, efficient storage, and/or any other suitable criteria.

During the course of a call into or, more generally, a session with call center system 108, caller 104 may effectively request an IVR breakout that enables caller 104 to interact with an agent system 116. In one embodiment, IVR system 112 may initiate an IVR breakout when caller 104 presses '0' on a telephone keypad, or speaks the word "operator" or "agent." When an agent system 116 is selected to participate in the IVR breakout with caller 104, interaction transcript 120 is provided to agent system 116 such that an agent (not shown) associated with agent system 116 may determine a context of the call. Interaction transcript 120 provides agent system 116 with an indication of a path through an IVR tree (not shown) undertaken by caller 104.

Figure 2:
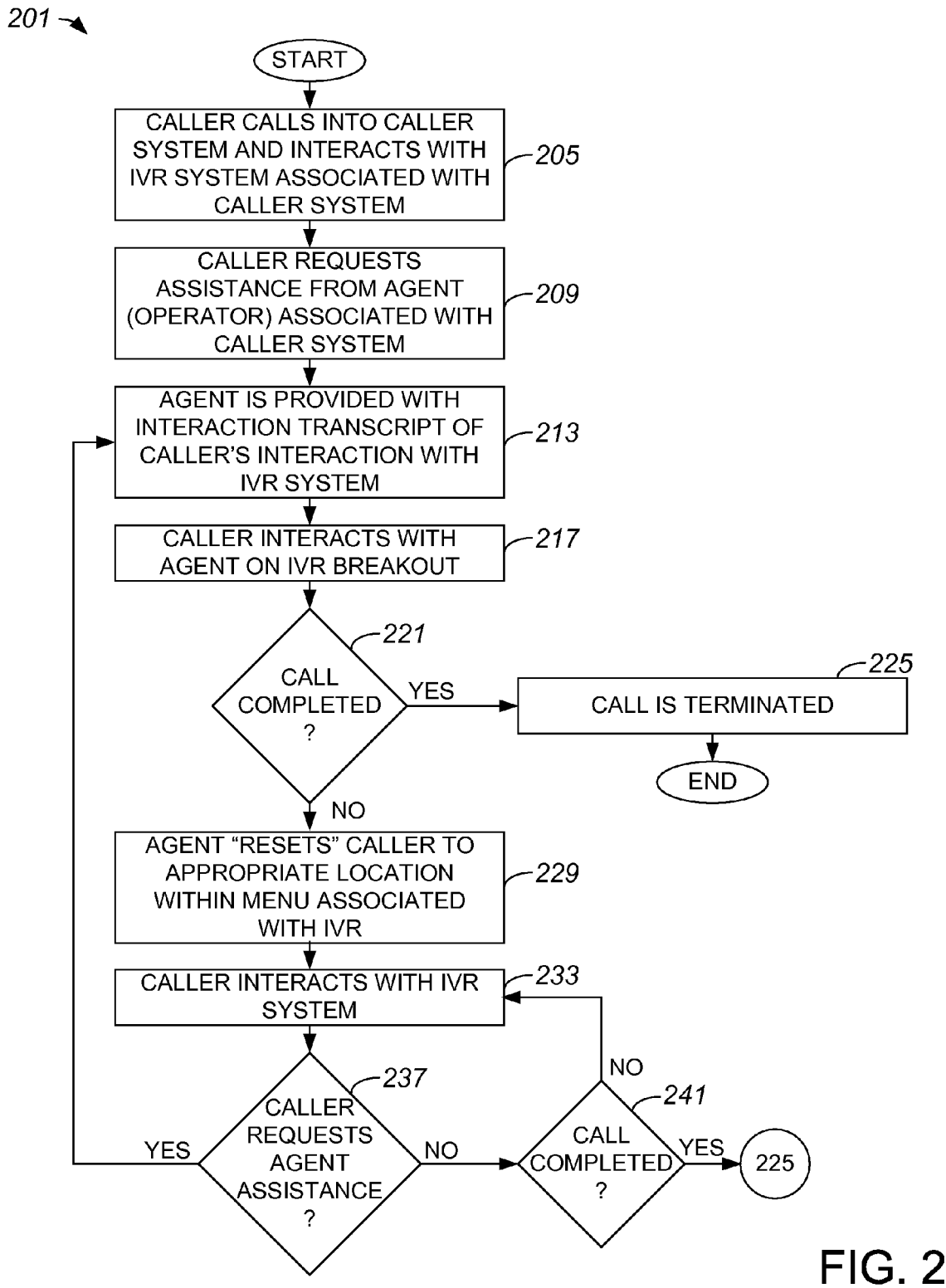
FIG. 2 is a process flow diagram which illustrates a method of a caller interacting with a call center system in accordance with an embodiment of the present invention.

With reference to FIG. 2, a process of a caller interacting with a call center system will be described in accordance with an embodiment of the present invention. A process 201 of interacting with a call center begins at step 205 in which a caller calls into, or otherwise accesses, a caller system or call center system, and interacts with an IVR system associated with the caller system. Interacting with the IVR system may include, but is not limited to including, listening to instructions, listening to menu options, selecting menu options, and providing other input to IVR system. It should be appreciated that while the caller interacts with the IVR system, an interaction transcript is typically updated to identify the interactions.

During the course of interacting with the IVR system, the caller requests assistance from an agent associated with the caller or call center system in step 209. In other words, the caller indicates that he or she would like an IVR breakout. For purposes of illustration, the caller requests assistance from an agent, although it should be appreciated that in some interactions with the IVR system, the caller may achieve his or her purpose substantially without consulting with an agent.

After the caller requests assistance from an agent, an agent is provided with an interaction transcript which identifies IVR path information for the caller in step 213. That is, the agent is provided with context information pertaining to the call made by the caller. The interaction transcript may be provided to the agent and rendered, e.g., by an agent system, such that the agent may effectively view the contents of the interaction transcript.

Once the agent is provided with the interaction transcript, the caller interacts with the agent on an IVR breakout in step 217. The interaction between the caller and the agent generally includes conversation. In the described embodiment, the agent may effectively leverage the context information provided in the interaction transcript into the conversation, as the agent is aware of the actions taken by the caller with respect to the IVR system.

A determination is made in step 221 as to whether the call is completed. A call may be completed when the agent has provided satisfactory service to the caller, or when the caller otherwise breaks off communication with the agent, e.g., when the caller hangs up his or her phone. If it is determined that the call is completed, the call is terminated in step 225, and the process of interacting with a call center is completed.

Alternatively, if it is determined in step 221 that the call has not been completed, then the indication is that the caller has completed his or her interaction with the agent. In the described embodiment, after the caller completes his or her interaction, the caller will continue the call by interacting with the IVR system. As such, process flow proceeds form step 221 to step 229 in which the agent effectively resets the caller to an appropriate location within the tree or menu associated with the IVR. The agent may determine, through interacting with the caller during an IVR breakout, an appropriate menu for the user to interact with in order. By way of example, if the agent determines that the caller has been entering an incorrect account number, the caller may enable the caller to re-enter an IVR tree or menu at the point at which he or she enters an account number. When the agent resets the caller to an appropriate location within an IVR tree or menu, the caller may substantially avoid having to "re-provide" information to the IVR tree or menu which was previously correctly provided. In one embodiment, an appropriate location within an IVR tree or menu may be the beginning of the IVR tree or menu.

After the agent resets the caller with respect to the IVR tree or menu, the caller continues the call into the call center by interacting with the IVR system in step 233. While the caller interacts with the IVR system, an interaction transcript associated with the call is updated.

In step 237, it is determined whether the caller once again requests assistance from an agent. If it is determined that the caller requests agent assistance, process flow returns to step 213 in which an agent is provided with the interaction transcript associated with the caller. Alternatively, if it is determined that the caller has not requested assistance from an agent, a determination is made in step 241 regarding whether the call is completed.

When the determination in step 241 is that the call is not completed, the caller continues to interact with the IVR system in step 233. If, on the other hand, it is determined in step 241 that the call is completed, the implication may be that the caller has successfully accomplished the purpose of the call. Accordingly, process flow moves from step 241 to step 225 in which the call is terminated, and the process of interacting with a call center is completed.

Figure 3:
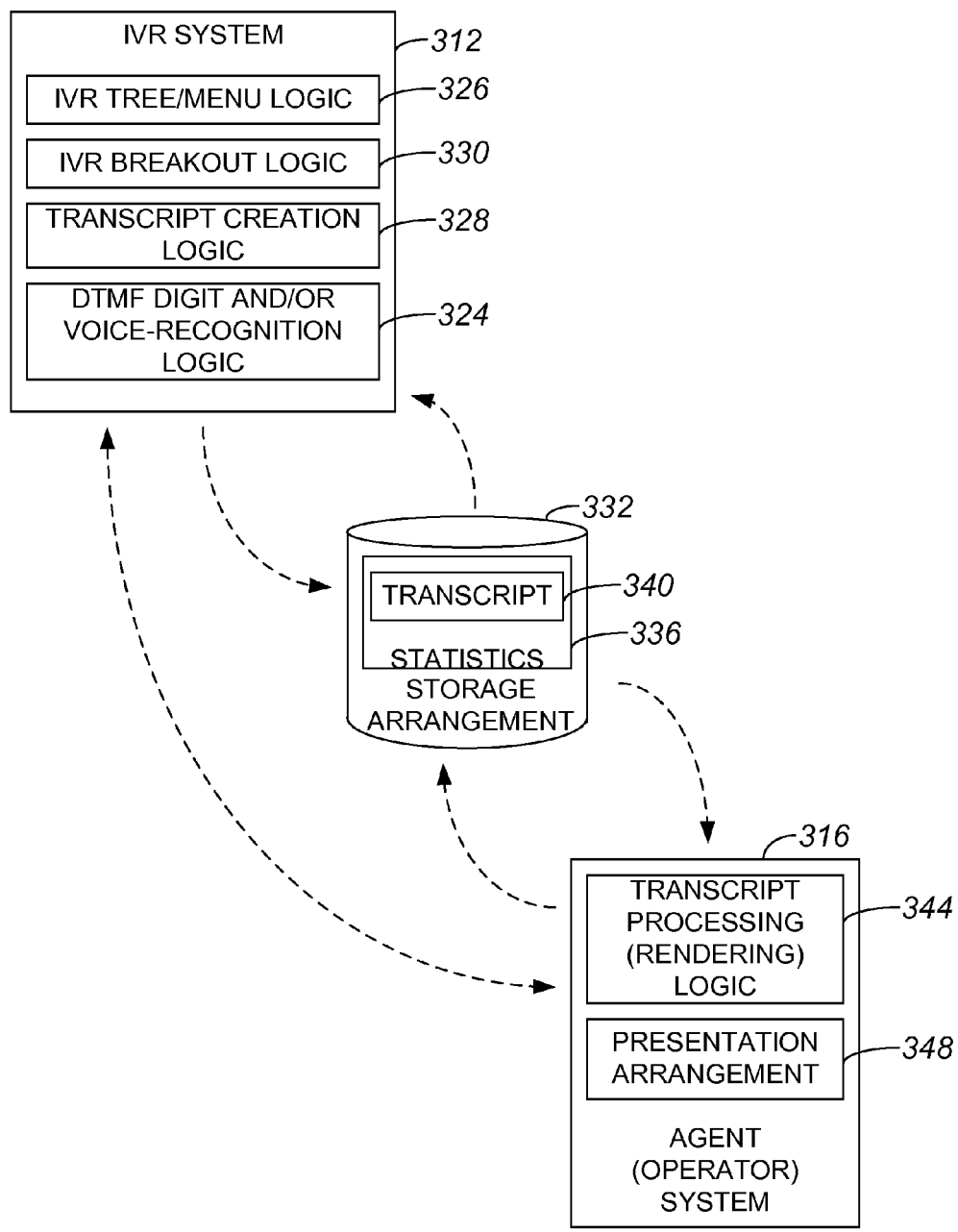
FIG. 3 is a block diagram representation of a call center system in which a call center agent is presented with a caller interaction transcript in accordance with an embodiment of the present invention.

FIG. 3 is a block diagram representation of a call center system in which an agent is presented with an interaction transcript in accordance with an embodiment of the present invention. A call center system 308 includes an IVR system 312, a storage arrangement 332, and at least one agent system or interface 316. Call center system 308 is generally arranged to provide an agent system 316 with an interaction transcript 340 associated with a call when appropriate, e.g., when an agent (not shown) using agent system 316 is to participate in the call.

A caller (not shown) who calls into call center system 308 may effectively access IVR system 312. IVR system 312 includes DTMF digit and/or voice-recognition logic 324, IVR tree or menu logic 326, transcript creation logic 328, and IVR breakout logic 330. DTMF digit and/or voice-recognition logic 324 is arranged to obtain, interpret, and otherwise process inputs from a caller (not shown). IVR tree or menu logic 326 is arranged to effectively route a caller (not shown) to appropriate locations within an IVR tree or menu structure based at least in part upon the inputs processed by DTMF digit and/or voice-recognition logic 324. Transcript creation logic 328 is configured to create an interaction transcript that includes context information associated with a call or user session. The context information may include, but is not limited to including, IVR path information that identifies a path of a caller (not shown) through an IVR tree or menu structure, as well as information provided with respect to prompts from the IVR tree or menu structure. IVR breakout logic 330 is arranged to determine when a caller (not shown) has requested an IVR breakout in which an agent system such as agent system or interface 316 may participate.

Interaction transcript 340, which may be generated and subsequently updated by transcript creation logic 328, is stored in storage arrangement 332. Storage arrangement 332 may be a database or a memory arrangement. Interaction transcript 340 may be stored as statistics 336 in storage arrangement 332. In general, statistics 336 are maintained by call center system 308 for substantially any calls received or otherwise obtained by call center system 308.

As discussed above, when a caller (not shown) who is interacting with IVR system 312 indicates an interest in an IVR breakout with an agent, IVR breakout logic 330 may effectively create an IVR breakout in which the caller and agent system 316 participate. Interaction transcript 340 is provided to agent system 316 when the IVR breakout is initiated.

Agent system or interface 316 includes transcript processing logic 344 that is arranged to process interaction transcript 340, as appropriate, to allow a rendering of the information contained in interaction transcript 340 to be presented on a presentation arrangement 348 associated with agent system 316. In one embodiment, transcript processing logic 344 may create a visual representation of information contained in interaction transcript 340. Such a visual representation may be displayed on presentation arrangement 348, e.g., a display screen, such that when an agent (not shown) utilizes agent system 316, the agent may view the visual representation.

Figure 4A:
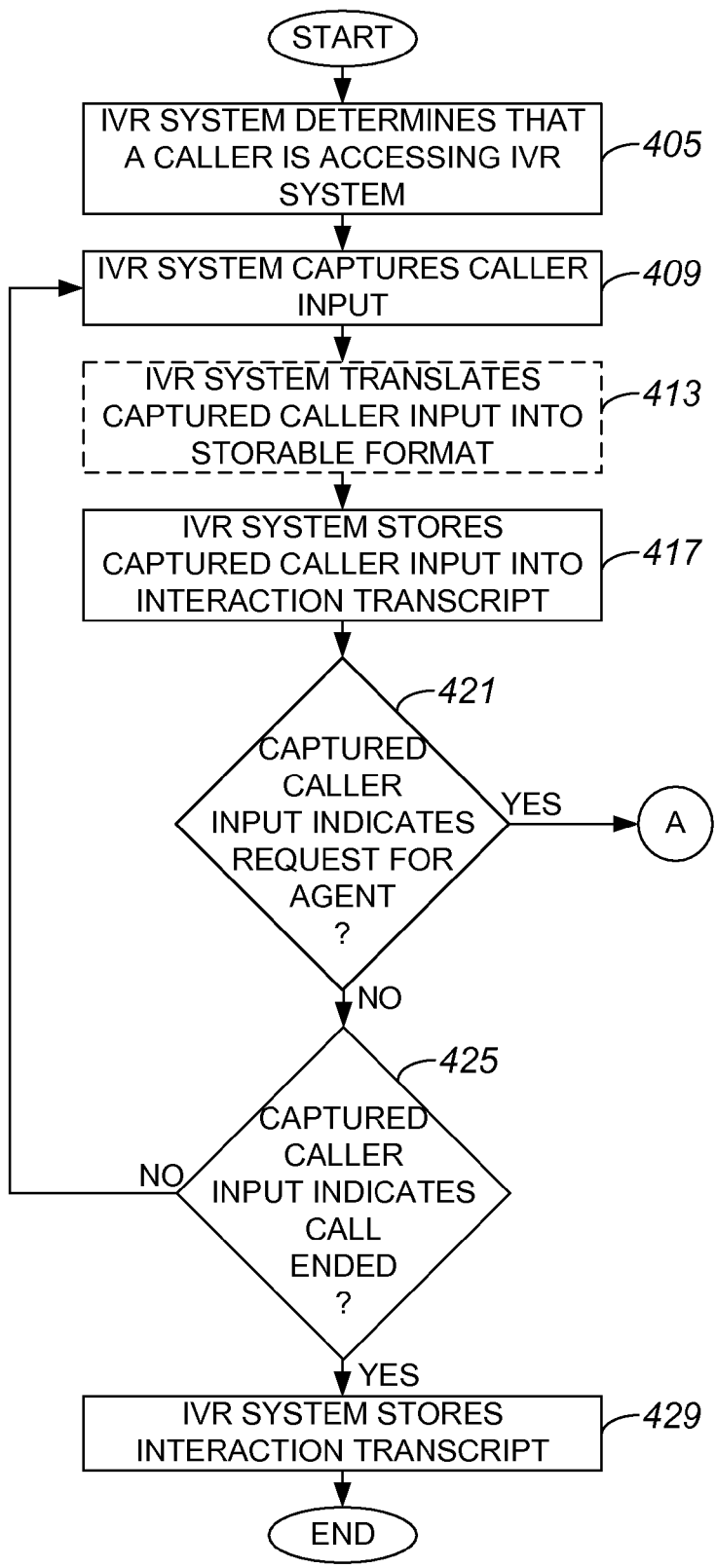
FIGS. 4A and 4B are a process flow diagram which illustrates a method of processing a call from a caller from the point-of-view of an IVR system in accordance with an embodiment of the present invention.
Figure 4B:
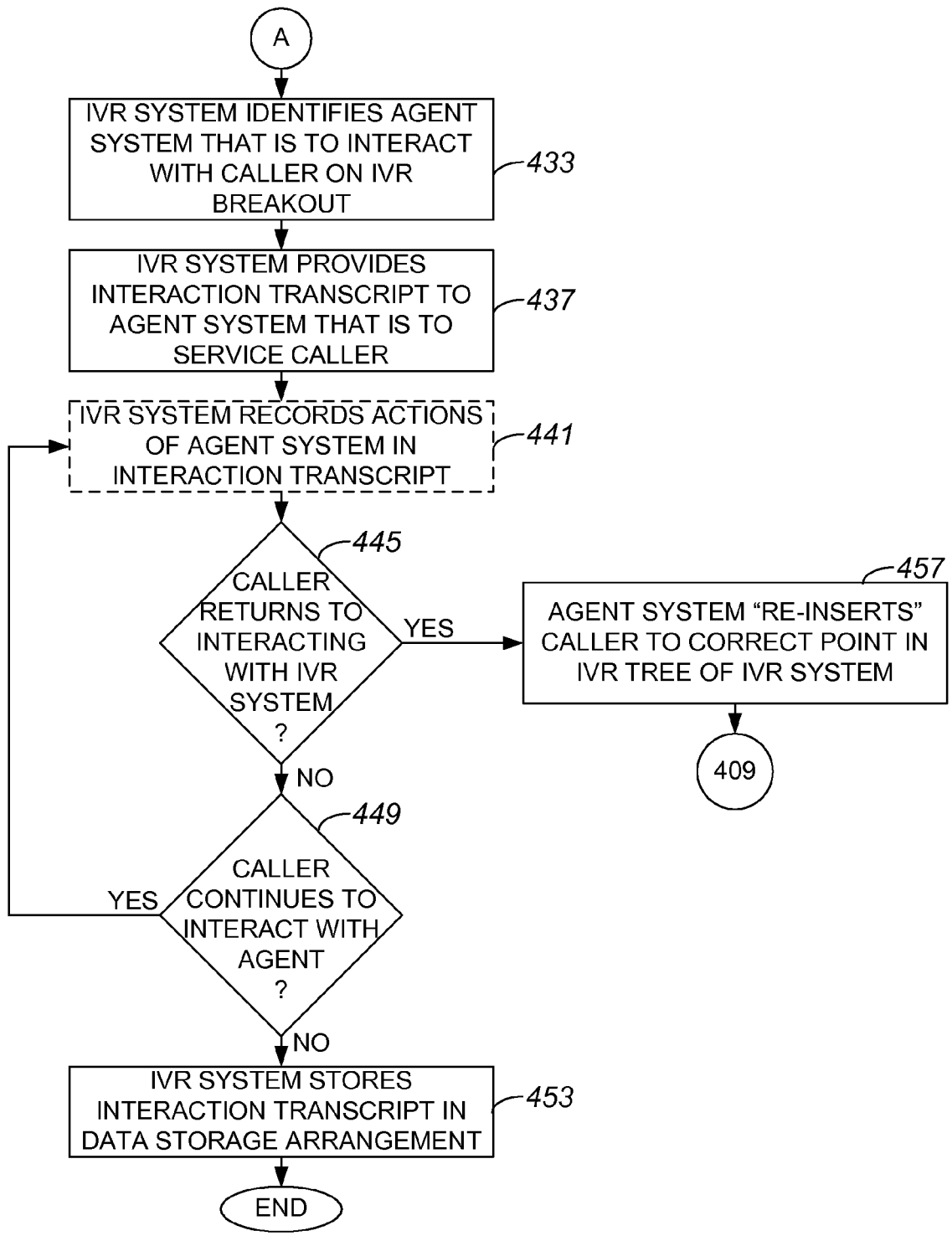

An IVR system such as IVR system 312 of FIG. 3 generally processes inputs provided by a caller during a call, creates an interaction transcript pertaining to the call, and provides the interaction transcript to an agent system or interface which the caller indicates an interest in communicating with an agent. FIGS. 4A and 4B are a process flow diagram which illustrates a method of processing a call from a caller from the point-of-view of an IVR system in accordance with an embodiment of the present invention. A method 401 of processing a call begins at step 405 in which an IVR system determines that a caller is accessing the IVR system, e.g., during a call. Once the IVR system determines that the caller is accessing the IVR system, the IVR system effectively captures caller input in step 409.

In step 413, the IVR system optionally translates the captured caller input into a storable format, or a format that is suitable for storage in an interaction transcript. It should be appreciated that in some instances, the caller input captured by the IVR system is already in a substantially storable format.

The IVR system stores the captured caller input into an interaction transcript associated with the call in step 417. If the caller input was translated into a storable format in step 413, then the stored captured caller input may be the translated caller input. After the IVR system stores the captured caller input, it is determined in step 421 whether the captured caller input indicates that the caller has requested an interaction with an agent. In one embodiment, if the captured caller input indicates that the caller has inputted a '0,' or spoken the word "agent" or "operator," the implication is that the captured caller input indicates a request from an agent.

If the captured caller input indicates that the caller has requested an interaction with an agent, the IVR system identifies an agent system that is to interact with the caller on an IVR breakout, or communications session, in step 433. It should be appreciated that the selected agent system may be substantially any available agent system that may be accessed by an available agent. Once an agent system is identified, the IVR system provides the interaction transcript to the agent system or interface associated with the agent in step 437.

In step 441, the IVR system optionally records the actions of the agent system in the interaction transcript. That is, the IVR system may record actions taken using the agent system during the course of the IVR breakout. By way of example, the agent system may be used to enter a caller's account number into the IVR system through the agent system, or to correct or otherwise modify incorrect information that was previously inputted into the IVR system by the caller and recorded in the interaction transcript.

A determination is made in step 445 as to whether the caller has returned to interacting with the IVR system. If it is determined that the caller has returned to interacting with the IVR system, then the agent system re-inserts the caller to an appropriate point in an IVR tree of the IVR system in step 457. Such a re-insertion may occur through the use of the agent system or interface. The appropriate point may be, for example, an entry point into the IVR tree or the point in the IVR tree at which the caller inputted incorrect information. After the agent system re-inserts the caller to the correct point in the IVR tree, process flow returns to step 409 in which the IVR system captures caller input.

Alternatively, if it is determined in step 445 that the caller has not returned to interacting with the IVR system, a determination is made in step 449 regarding whether the caller continues to interact with the agent. In other words, it is determined in step 449 whether the IVR breakout is still in session. If it is determined that the caller continues to interact with the agent, then process flow returns to step 441 in which the IVR system optionally records actions of the agent system in the interaction transcript.

If, however, the determination in step 449 is that the caller is not continuing to interact with the agent, the indication is that the caller has completed the call. As such, the IVR system stores the interaction transcript in a data store arrangement in step 452, and the processing of a call is completed.

Returning to step 421 in which it is determined whether the captured caller input indicates a request for an agent, if the determination is that a request for an agent is not indicated, then it is determined in step 425 if the captured caller input indicates that the call has ended. If an end of the call is not indicated, then process flow moves from step 425 to step 409 in which the IVR system captures caller input. Alternatively, if the captured caller input indicates that the call has ended, then the IVR system stores the interaction transcript in step 429. Once the interaction transcript is stored, the processing of a call is completed.

When an agent system obtains an interaction transcript, the agent system may render the interaction transcript into a format that may be presented using the agent system. In one embodiment, the interaction transcript may effectively be translated into a graphical visual representation which may be displayed on a display screen of the agent system. When an agent has access to a visual representation of the contents of an interaction transcript, the agent may be able to assess the previous activities of a caller, and efficiently provide assistance to the caller. For example, the agent may be able to determine that the caller has repeatedly accessed the same menu or traversed the same branch of an IVR tree, and instruct the caller on how to avoid accessing that menu or branch again. The agent may also able to identify a location within an IVR tree at which a caller likely ran into difficulty, e.g., by determining the point in his or her interactions with the IVR tree at which the caller requested assistance from an agent.

Figure 5:
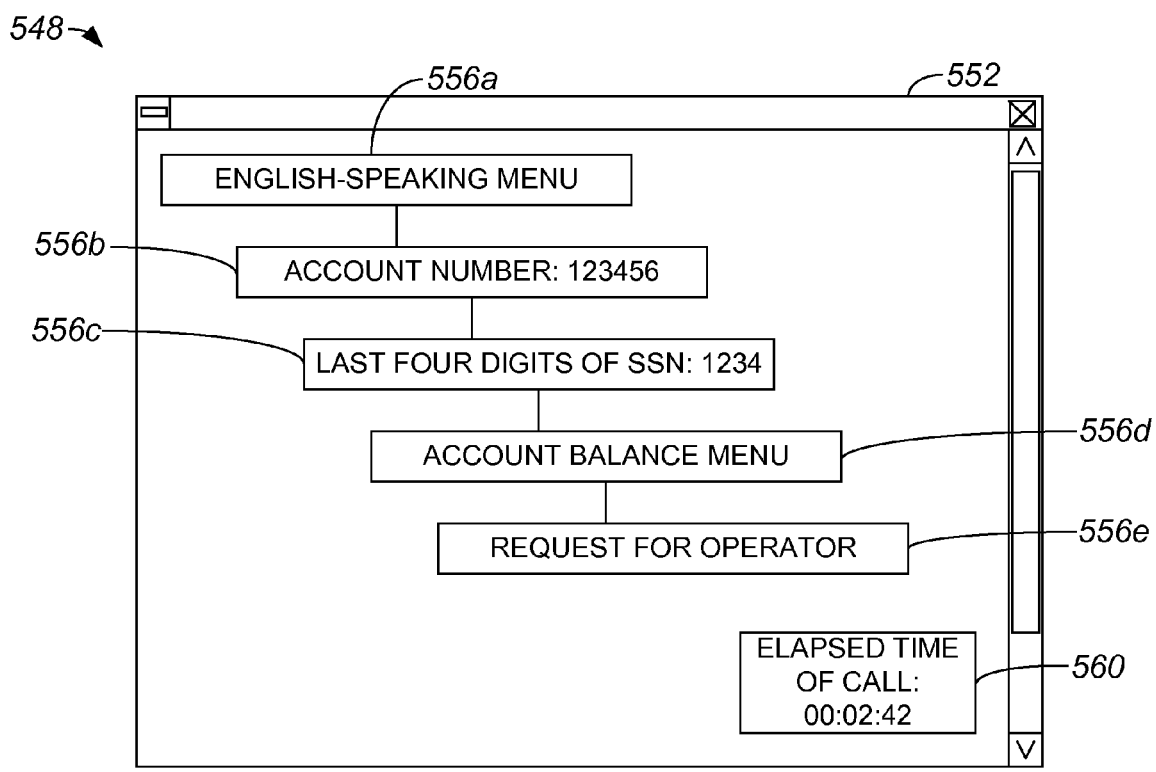
FIG. 5 is a diagrammatic representation of an interaction transcript as rendered on an operator system in accordance with an embodiment of the present invention.

FIG. 5 is a diagrammatic representation of an interaction transcript as rendered for display on a presentation arrangement, e.g., a display screen, of an agent system in accordance with an embodiment of the present invention. A presentation arrangement 548 is arranged to display a window 552 in which information 556a-e contained with an interaction transcript is included. Information 556a-e may identify menus or branches in an IVR tree that a caller has interacted with, as well as data provided to an IVR system by the caller. As shown, caller initially requested an English-speaking menu 556a, then entered an account number 556b and a portion or his or her social security number 556c. The caller accessed an account balance menu 556e, and then requested assistance from an agent 556e. Hence, in viewing window 552, an agent may infer that the caller likely had difficulties with account balance menu 556d.

In addition to including information 556a-e from an interaction transcript of a call, window 552 may also include other information associated with the call. For example, window 552 may include an elapsed time of the call 560. Elapsed time of the call 560 may allow the agent to determine how long the caller has likely been attempting to achieve his or her purpose, i.e., the purpose of the call associated with the interaction transcript. When the agent is aware of how long the caller has been attempting to achieve his or her purpose, the agent may be better able to serve the caller, e.g., by offering sympathy for his or her frustration.

At times, a caller who has called into a call center system and navigated through an IVR tree may lose his or her connection to the call center system. That is, a call may be prematurely terminated or otherwise disconnected. In one embodiment, if the caller calls back into the call center within a predetermined amount of time after his or her previous call was terminated, an IVR system may determine that the caller had recently called, and may retrieve the interaction transcript for the previous call. Using the interaction transcript, the IVR system may identify the location in an IVR tree where the caller was essentially located when his or her previous call was terminated, and effectively re-insert the caller back to that location. By re-inserting the caller back to the location he or she was at when the previous call was terminated, the caller may be spared from re-entering information which was previously entered.

Figure 6:
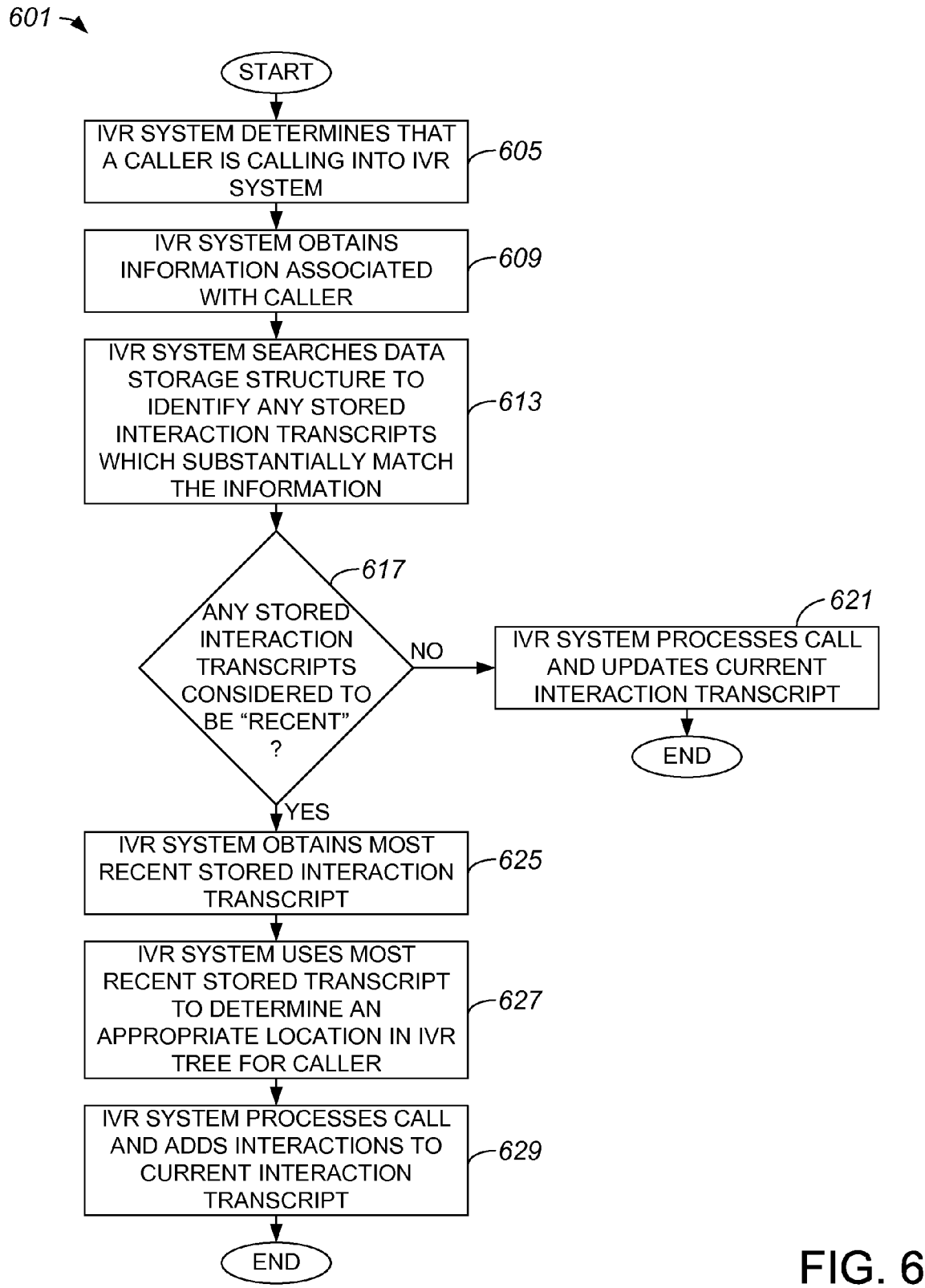
FIG. 6 is a process flow diagram which illustrates a method of handling a call placed by a caller that includes associating a recent interaction transcript with the caller in accordance with an embodiment of the present invention.

Referring next to FIG. 6, a method handling a call placed by a caller that includes associating a recent interaction transcript with the caller will be described in accordance with an embodiment of the present invention. A process 601 of handling a call begins at step 605 in which an IVR system determines that a caller is calling into the IVR system or, more generally, a call center system. Once the IVR system determines that a caller is calling, the IVR system obtains information associated with the caller in step 609. The information associated with the caller may include, but is not limited to, a telephone number from which the caller is placing the current call, and account information such as an account number. Such information may be obtained, for example, when the caller interacts with the IVR system during the current call. It should be appreciated that such information may be stored in a current interaction transcript that is created with respect to the current call.

While information regarding a telephone number from which the caller is placing the current call may be obtained and associated with the caller, the use of a telephone number may generally be one of a number of factors used to effectively identify the caller. As a telephone number may be shared by any number of individuals, it may not always be possible to effectively identify a caller using a telephone number substantially alone.

After the IVR system obtains information associated with the caller, the IVR system searches a data storage structure or arrangement to identify any stored interaction transcripts which substantially match the information in step 613. By way of example, if the information associated with the caller is an account number, the IVR system may search for interaction transcripts associated with previous calls that identify the account number.

It is determined in step 617 whether the IVR system has identified any stored interaction transcripts which substantially match the information associated with the caller, and may be considered to be relatively recent. If a caller has previously made calls to the call center system, there may be multiple interaction transcripts which substantially match the information associated with the caller. Factors which may be used to assess whether a stored interaction transcript is considered to be relatively recent may vary widely. Factors may include, but are not limited to including, an amount of time that has elapsed between the time a store interaction transcript was created and a current time. In one embodiment, a stored interaction transcript may be considered to be recent if is associated with a previous call that occurred within less than approximately a certain number of minutes, e.g., less than approximately two minutes ago.

If it is determined that there are no stored transcripts which are considered to be relatively recent, the indication is that the caller likely has not recently called into the call center system. As such, in step 621, the IVR system processes the call and updates the current interaction transcript as appropriate. One method of processing a call was previously described with respect to FIGS. 4A and 4B. The process of handling a call is completed after the IVR system processes the call.

Alternatively, if it is determined in step 617 that there is at least one stored interaction transcript which is considered to be relatively recent, the IVR system obtains the most recent stored interaction transcript in step 625. Then, in step 627, the IVR system uses the most recent stored transcript to determine an appropriate location in the IVR tree for the caller. By way of example, the IVR system may identify the IVR tree branch or menu with which the caller was interacting when the call associated with the most recent stored interaction transcript was terminated, and offer to place the caller back to that IVR tree branch or menu. For purposes of illustration, it is assumed that the caller accepts the offer to place the caller back at the IVR tree branch or menu with which he or she was interacting when the previous call, i.e., the call associated with the most recent stored interaction transcript, terminated.

From step 627, process flow moves to step 629 in which the IVR system processes the call, and adds interactions between the caller and the IVR system to the current interaction transcript. The process of handling a call is completed after the IVR system processes the call.

Although only a few embodiments of the present invention have been described, it should be understood that the present invention may be embodied in many other specific forms without departing from the spirit or the scope of the present invention. By way of example, an interaction transcript has been described as being suitable for use in providing an agent with the context of a call made by a caller. However, in general, any suitable arrangement and/or method may be used to provide an agent with the context of a call. That is, providing context to an agent is not limited to utilizing an interaction transcript.

Using information contained in an interaction transcript, an agent may readily identify when a caller has been consistently making an error in specifying a particular piece of information, e.g., an account number. As such, at the beginning of an IVR breakout involving the agent and the caller, the caller may display familiarity with the interactions of the caller with an IVR system by stating that it appears that the caller has been repeatedly making an error in specifying the particular piece of information. The agent may then assist the caller in locating the particular piece of information.

While information contained in an interaction transcript has been described as being processed to create a visual representation of the information, substantially any representation of the information may be created. For example, an agent may be provided with a textual or an audio representation of the information without departing from the spirit or the scope of the present invention.

A visual representation of information contained in an interaction transcript may be arranged to highlight factors that may have an effect on the satisfaction of a caller. By way of example, repeated traversals through the same branch of an IVR tree may be highlighted, and repeated returns to a main node or beginning point of the IVR tree may be highlighted.

In one embodiment, analytics information such as emotional content may be included in an interaction transcript. For instance, if an IVR system determines that a caller has been shouting at the IVR system, such information may effectively be embedded into the transaction transcript. When a transaction transcript that includes information which indicates that a caller has been shouting is provided to an agent, the agent may be able to handle the caller appropriately, e.g., by sympathizing with the caller. Generally, information which indicates that a caller has been shouting may be used to flag the caller such that an agent may relatively easily determine that the caller has likely had an unsatisfactory experience with the IVR system.

The present invention may be implemented as hardware and/or software logic embodied in a tangible medium that, when executed, is operable to perform the various methods and processes described above. The logic may be implemented as hardware logic, software logic, or a combination of both hardware and software logic.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:
1. A method comprising:
obtaining context information associated with a call into a call center, the call center including an interactive voice response (IVR) system, the context information including at least one input provided by a caller during the call, the at least one input being provided by the caller to the IVR system, wherein the IVR system supports an IVR tree and wherein the context information identifies interactions between the caller and the IVR tree, wherein the context information is stored in an interaction transcript, the interaction transcript being arranged to identify a path through the IVR tree that is navigated by the caller, the interaction transcript further being associated with the call;

determining when the caller requests an interaction with an agent associated with the call center;

providing the context information to the agent when it is determined that the caller requests the interaction with the agent;

maintaining a communications session between the caller and the agent when it is determined that the caller requests the interaction with the agent;

determining when the agent has identified an appropriate location within the IVR tree at which to allow the caller is to resume the interactions between the caller and the IVR system; and allowing the caller to resume the interactions between the caller and the IVR system at the appropriate location within the IVR tree when it is determined that the agent has identified the appropriate location within the IVR tree.

2. The method of claim 1 further including:
ending the communications session; and
storing the interaction transcript.

3. The method of claim 2 wherein ending the communications session includes ending the communications session after allowing the caller to resume the interactions between the caller and the IVR system at the appropriate location within the IVR tree.

4. Logic encoded in one or more non-transitory computer-readable media for execution and when executed operable to:

obtain context information associated with a call into a call center, the call center including an interactive voice response (IVR) system, the context information including at least one input provided by a caller during the call, the at least one input being provided by the caller to the IVR system, wherein the IVR system supports an IVR tree and wherein the context information identifies interactions between the caller and the IVR tree, wherein the context information is stored in an interaction transcript, the interaction transcript being arranged to identify a path through the IVR tree that is navigated by the caller, the interaction transcript further being associated with the call;

determine when the caller requests an interaction with an agent associated with the call center;

provide the context information to the agent when it is determined that the caller requests the interaction with the agent;

maintain a communications session between the caller and the agent when it is determined that the caller requests the interaction with the agent determine when the agent has identified an appropriate location within the IVR tree at which to allow the caller is to resume the interactions between the caller and the IVR system; and allow the caller to resume the interactions between the caller and the IVR system at the appropriate location within the IVR tree when it is determined that the agent has identified the appropriate location within the IVR tree.

5. The logic of claim 4 further operable to:
end the communications session; and
store the interaction transcript.

6. An apparatus, the apparatus being an interactive voice response (IVR) system associated with a call center system, comprising:

an first arrangement, the first arrangement being arranged to obtain at least a first input from a first party, wherein the first party is a caller to the call center system;

a second arrangement, the second arrangement being arranged to implement a menu structure, the menu structure being an IVR tree, the second arrangement further being arranged to process the at least first input from the first party to assist the first party in navigating through the menu structure;

a third arrangement, the third arrangement being arranged to store context information in a transcript, wherein the context information is arranged to identify the at least first input and to identify a path traversed by the first party in navigating through the menu structure; and a fourth arrangement, the fourth arrangement being arranged to determine when the first party has requested an interaction with an agent, the fourth arrangement further being arranged to provide the transcript to the agent when it is determined that the party has requested the interaction with the agent, wherein the second arrangement is arranged to assist the first party in navigating through the IVR tree, and wherein when the agent identifies a first location within the IVR tree at which the first party is to resume navigating through the menu structure, the second arrangement is further arranged to allow the first party to resume navigating through the menu structure beginning approximately at the first location.

* * * * *